(12) United States Patent
Wooste et al.

(10) Patent No.: X6086
(45) Date of Patent: Aug. 3, 1830

(54) PAPER, MANUFACTURING, FROM WOOD

(76) Inventors: Lewis Wooste; Joseph E. Holmes

Lewis Wooster & Joseph E Holmes. Crawford Penn.

Letters Patent.

The Schedule referred to in these Letters Patent and making part of the same containing a description in the words of the said Lewis Wooster & Joseph E Holmes themselves of their improvement in the mode of making or manufacturing paper for writing printing wrapping and boards from wood.

To all to whom these presents shall come Lewis Wooster & Joseph E Holmes of the County of Crawford and State of Pennsylvania send greeting.

Be it known that the said Lewis Wooster and Joseph E Holmes have invented constructed made and applied to use a new and useful improvement in making or manufacturing paper for writing printing wrapping and boards from wood. the preparation for which for making the paper in the common paper mills is as follows viz the wood is reduced to shavings of the ordinary jack plane shaving size & bruised so as to be reduced to nearly the same size of the shavings. they are then placed in a cistern or boiler of sufficient dimensions and covered with water which is put to a boiling heat to every one hundred pounds of the wood (thus reduced) put from 12 to 8 pounds of alkali either vegetable or mineral in proportion to its quality or strength if salts are used they should be reduced before they are placed on the wood in the cistern or boiler with the water they may however be put in with the water and wood upon reflection [illegible] the [illegible] is found the most preferable should lime be used there must be a sufficient quantity in all cases to equal twelve pounds of pure potash salts for every one hundred pounds of wood which may be leached upon being placed in the cistern with the wood & water or otherwise in its pure state one hundred of wood that

United States Patent
Patent No.: X6086
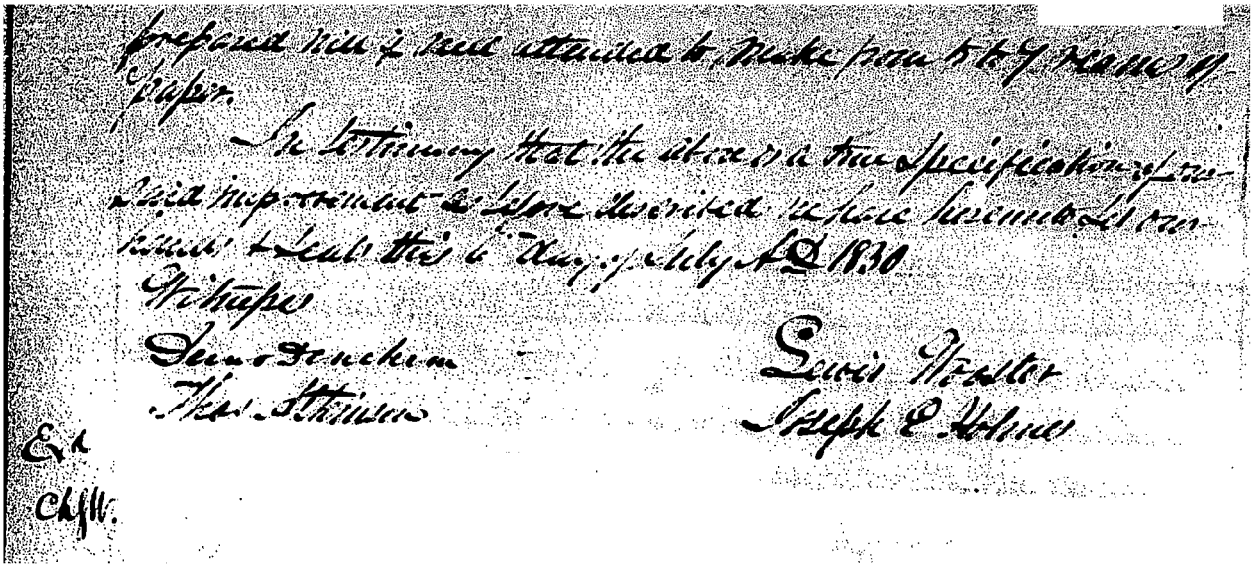
Witnesses
Samuel Strachan
Wm. Stevens
Lewis Wooster
Joseph E. Adams
Ex
Chf.